United States Patent
Peck et al.

(10) Patent No.: US 10,434,471 B2
(45) Date of Patent: Oct. 8, 2019

(54) COPPER OXIDES SUPPORTED ON SPINEL OXIDES AS CATALYSTS FOR LOW TEMPERATURE DIRECT NOX DECOMPOSITION

(71) Applicant: Toyota Motor Engineering & Manufacturing North America, Inc., Erlanger, KY (US)

(72) Inventors: Torin C. Peck, Ypsilanti, MI (US); Michael Jones, Orchard Lake, MI (US); Krishna R. Gunugunuri, Canton, MI (US); Charles Alexander Roberts, Farmington Hills, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/488,996

(22) Filed: Apr. 17, 2017

(65) Prior Publication Data

US 2018/0296978 A1   Oct. 18, 2018

(51) Int. Cl.
| | |
|---|---|
| *B01D 53/94* | (2006.01) |
| *F01N 3/10* | (2006.01) |
| *B01J 23/00* | (2006.01) |
| *B01J 23/72* | (2006.01) |

(Continued)

(52) U.S. Cl.
CPC ........ *B01D 53/9413* (2013.01); *B01J 23/005* (2013.01); *B01J 23/72* (2013.01); *B01J 23/75* (2013.01); *B01J 35/0006* (2013.01); *F01N 3/10* (2013.01); *F01N 3/108* (2013.01); *B01D 2255/20746* (2013.01); *B01D 2255/20761* (2013.01); *B01D 2255/405* (2013.01); *B01D 2257/404* (2013.01); *F01N 2370/02* (2013.01);

(Continued)

(58) Field of Classification Search
None
See application file for complete search history.

(56) References Cited

U.S. PATENT DOCUMENTS

| | | | | |
|---|---|---|---|---|
| 3,493,325 A | * | 2/1970 | Roth ............... | B01D 53/944 |
| | | | | 423/213.2 |
| 2013/0294989 A1 | * | 11/2013 | Koch ............... | B01D 53/9477 |
| | | | | 423/213.5 |

OTHER PUBLICATIONS

Reddy et al. Copper Promoted Cobalt and Nickel catalysts . . . Ind. Eng. Chem. Res. 8478-8486, 48 (2009). (Year: 2009).*

(Continued)

*Primary Examiner* — Sheng H Davis
(74) *Attorney, Agent, or Firm* — Christopher G. Darrow; Darrow Mustafa PC

(57) ABSTRACT

Active catalysts for the treatment of a low temperature exhaust gas stream are provided containing copper oxides dispersed on a spinel oxide for the direct, lean removal of nitrogen oxides from the exhaust gas stream. The low temperature, direct decomposition is accomplished without the need of a reductant molecule. In one example, $CuO_x$ may be dispersed as a monolayer on a metal oxide support, such as $Co_3O_4$ spinel oxide, synthesized using an incipient wetness impregnation technique. The $CuO_x/Co_3O_4$ catalyst system converts nitric oxide to nitrogen gas with high product specificity, avoiding the production of a significant concentration of the undesirable $N_2O$ product.

13 Claims, 13 Drawing Sheets

(51) Int. Cl.
*B01J 23/75* (2006.01)
*B01J 35/00* (2006.01)

(52) U.S. Cl.
CPC .... *F01N 2510/06* (2013.01); *F01N 2510/068* (2013.01); *F01N 2570/14* (2013.01)

(56) References Cited

OTHER PUBLICATIONS

Rashad, et al. "CuO and Co3O4 Nanoparticles: synthesis, Characterization . . . " Journal of Nanomaterials. (Year: 2013).*
Radwan, et al. "Surface and Catalytic Properties of CuO and Co3O4 . . . ". Applied Catalysis A. General. 77-90, 241 (2003). (Year: 2003).*
Imanaka, N. et al., "Advances in direct NOx decomposition catalysts", Applied Catalysis A: General, 431-432, pp. 1-8 (2012).
Piumetti, M. et al., "Catalysis in Diesel engine NOx aftertreatment: a review," Catalysis, Structure & Reactivity, vol. 1, No. 4, pp. 155-173 (2015).
Patel, A. et al., "Structural sensitivity of mesoporous alumina for copper catalyst loading used for NO reduction in presence of CO," Chemical Engineering Research and Design, vol. 101, pp. 27-43 (2015) (Abstract only).
Ivanov, B., "Effect of the addition of rare earths on the activity of alumina supported copper cobaltite in CO oxidation, CH4 oxidation and NO decomposition," Journal of Rare Earths, vol. 33, No. 4, pp. 382-390 (2015).
Moden, B. et al., "Catalytic NO Decomposition on Cu-ZSM5: Kinetically Relevant Elementary Steps and Speciation and Role of Cu Structures," presented at the 18th North American Catalysis Society Meeting, Cancun, Mexico, Jun. 2, 2003.
Haneda, M. et al., "Alkali metal-doped cobalt oxide catalysts for NO decomposition," Applied Catalysis B: Environmental, vol. 46, pp. 473-482 (2003).
Zhang, Y. et al., "Hydrothermal Stability of Cerium Modified Cu-ZSM-5 Catalyst for Nitric Oxide Decomposition," Journal of Catalysis, vol. 164, pp. 131-145 (1996).
Park, P.W. et al., "NO decomposition over sodium-promoted cobalt oxide," Catalysis Today, vol. 42, pp. 51-60 (1998).
Iwamoto, M. et al., "Copper(II) Ion-exchanged ZSM-5 Zeolites as Highly Active Catalysts for Direct and Continuous Decomposition of Nitrogen Monoxide," J. Chem. Soc., Chem. Commun., pp. 1272-1273 (1986).

* cited by examiner

COPPER OXIDES SUPPORTED ON SPINEL OXIDES AS CATALYSTS FOR LOW TEMPERATURE DIRECT NOX DECOMPOSITION

TECHNICAL FIELD

The present disclosure generally relates to catalysts for treatment of an exhaust gas stream and, more particularly, to catalysts containing copper oxides on a spinel for removal of nitrogen oxides from a low temperature exhaust gas stream as generated by an internal combustion engine, or the like.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Catalysts effective at removing NOx from exhaust emissions are desirable in order to protect the environment and to comport with regulations directed to that purpose. It is preferable that such catalysts convert NOx to inert nitrogen gas, instead of converting NOx to other nitrogen-containing compounds. Catalysts that are effective at low temperature may have additional utility for vehicles.

Increasingly stringent NOx emission and fuel economy requirements for vehicles and automobile engines will require catalytic NOx abatement technologies that are effective under lean-burn conditions. Direct NOx decomposition to $N_2$ and $O_2$ is an attractive alternative to NOx traps and selective catalytic reduction (SCR) for this application, as NOx traps and SCR processes are highly dependent on reductants (such as unburned hydrocarbons or CO) to mitigate NOx. The development of an effective catalyst for direct NOx decomposition would eliminate the use of reducing agents, simplifying the NOx removal process, and therefore decreasing the fuel efficiency cost of NOx abatement.

However, most catalysts active for direct NOx decomposition are only efficient at high temperatures (i.e., greater than about 600° C.), which severely limits a practical application for a vehicle exhaust gas stream. The most well-known low temperature (i.e., less than about 500° C.) direct NOx decomposition catalysts include Cu-ZSM5, $K/Co_3O_4$, $Na/Co_3O_4$, CuO, and $Ag/Co_3O_4$. However, low temperature activity and selectivity to $N_2$ for all of these catalysts is not sufficient for practical application, and more advancements are needed. Advancements in direct NOx decomposition catalysis based on structure activity relationships are lacking, and methodology to improve the performance of specific catalyst systems is needed.

Accordingly, it would be desirable to provide a catalyst for the removal of NOx from exhaust gas, that is effective at low temperature and that has high $N_2$ product specificity.

SUMMARY

This section provides a general summary of the disclosure, and is not a comprehensive disclosure of its full scope or all of its features.

In various aspects, the present teachings provide a catalyst system for the direct decomposition removal of $NO_x$ from an exhaust gas stream. In various aspects, the exhaust stream is provided at a temperature of less than or equal to about 500° C. The catalyst system includes a metal oxide support, such as a $Co_3O_4$ spinel oxide. A monolayer of $CuO_x$ is disposed on a surface of the $Co_3O_4$ spinel oxide, and configured to catalyze a reduction of the NOx to generate $N_2$ without the presence of a reductant.

In other aspects, the present teachings provide a catalytic converter for the direct decomposition removal of $NO_x$ from an exhaust gas stream flowing at a temperature of less than or equal to about 500° C. In various aspects, the catalytic converter includes an inlet configured to receive the exhaust gas stream into an enclosure, and an outlet configured to allow the exhaust gas stream to exit the enclosure. A catalyst system may be contained inside the enclosure. The catalyst system may include a monolayer of $CuO_x$ on a metal oxide support that is configured to catalyze a reduction of the NOx to generate $N_2$ without the presence of a reductant. The metal oxide support may include a $Co_3O_4$ spinel oxide. The monolayer of $CuO_x$ may be supported on the $Co_3O_4$ spinel oxide using incipient wetness impregnation techniques leading to the formation of discrete island regions of $CuO_x$ on a surface of the spinel oxide.

In still further aspects, the present teachings provide methods for the direct decomposition removal of $NO_x$ from a low temperature exhaust gas stream. In various implementations, the methods may include flowing the exhaust gas stream through an enclosure with a catalyst system, and exposing the exhaust gas stream to a copper oxide supported on a metal oxide support, for example, $CuO_x/Co_3O_4$. The methods include catalyzing a reduction of the NOx to generate $N_2$ without the presence of a reductant.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

Figure 1:
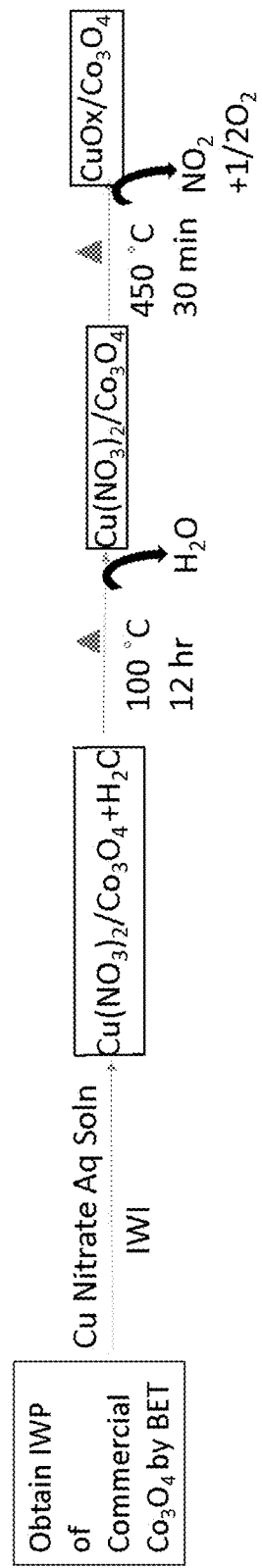
FIG. 1 is a schematic illustration showing a flow process for $CuO_x/Co_3O_4$ synthesis by incipient wetness impregnation.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide an active catalyst for the treatment of a low temperature exhaust gas stream. The catalyst includes copper oxides dispersed on a metal oxide support for the direct, lean removal of nitrogen oxides from the exhaust gas stream. The low temperature, direct decomposition is accomplished without the need of a reductant (i.e., $H_2$, CO, $C_3H_6$ or other hydrocarbons, and/or soot), thereby improving fuel efficiency. Direct decomposition, as discussed herein, refers to catalytic transformation of nitrogen oxides to elemental nitrogen and oxygen. This differs, for example, from catalytic reduction of nitrogen oxides to ammonia and water. In one example, $CuO_x$ may be dispersed as a monolayer on a metal oxide support, such as $Co_3O_4$ spinel oxide, synthesized using an incipient wetness impregnation technique. The $CuO_x/Co_3O_4$ catalyst system converts nitric oxide to nitrogen gas with high product specificity, all while avoiding the production of a significant concentration of the undesirable $N_2O$ product. In various preferred aspects, the $CuO_x/Co_3O_4$ catalyst may be operable at exhaust gas/stream temperatures lower than about 500° C., lower than about 450° C., lower than about 400° C., lower than about 350° C., lower than about 325° C., and even lower than or at about 300° C.

The presently disclosed catalyst system includes methods for dispersing copper oxide on a metal oxide support, specifically a spinel oxide with known $N_2O$ decomposition activity (i.e., $Co_3O_4$), via incipient wetness impregnation. This method particularly provides for improved total yield of product $N_2$ and product selectivity to $N_2$ (versus undesired $N_2O$ and/or $NO_2$ products) during low temperature direct NOx decomposition as compared to either the bare $Co_3O_4$ spinel oxide support only or the previously known most active direct NO decomposition catalyst: the ion-exchanged Cu-zeolite Cu-ZSM5. It should be understood that although the total percentage of NO conversion may be higher over Cu-ZSM5, much of the NO is converted to the highly undesirable product and potent greenhouse gas, $N_2O$. Because of the high selectivity to $N_2$ for the present teachings, the undesirable $N_2O$ product is not produced in a significant quantity during the direct NO decomposition over $Co_3O_4$ spinel-supported copper oxide. Additionally, it has been discovered that, on a per surface area basis, $CuO_x/Co_3O_4$ is more active than Cu-ZSM5.

As detailed herein, the present teachings not only include the development of the catalyst system, but also the utilization of the catalyst system with exhaust gas streams, particularly with catalytic converters for vehicles, automobiles, and the like, as well as including methods of synthesizing the $CuO_x$ supported in the spinel oxide.

NOx decomposition over Cu-ZSM5 or Cu—Co/$Al_2O_3$ catalysts, which may be considered by some to be the closest technology related to the present teachings, has poor selectivity to $N_2$ as a result of significant $N_2O$ production. This product is undesirable as $N_2O$ is a highly potent greenhouse gas, several hundred times more potent than $CO_2$. Specifically, the Cu—Co/$Al_2O_3$ catalyst is oxidized during operation, quickly losing activity, and is, therefore, not suitable for catalytic applications requiring long lifetimes. Alternatively, the $CuO_x/Co_3O_4$ as disclosed in the present technology displays good activity to $N_2$ production even after 2 hours on stream at various temperatures. Furthermore, the activity of the spinel supported $CuO_x$ can be optimized by formation of a $CuO_x$ monolayer on the spinel surface, and the resulting catalyst system has a greater NO decomposition activity than Cu-ZSM5 on a per surface area basis.

The catalyst system of the present disclosure can be used in a chamber or an enclosure, such as a catalytic converter, having an inlet and an outlet. As is commonly known to those of ordinary skill in the art, such a chamber or enclosure can be configured to receive an exhaust gas stream through the inlet and to exit the exhaust gas stream through the outlet, such that the exhaust gas stream has a particular or defined flow direction.

EXAMPLES

Various aspects of the present disclosure are further illustrated with respect to the following Examples. It is to be understood that these Examples are provided to illustrate specific embodiments of the present disclosure and should not be construed as limiting the scope of the present disclosure in or to any particular aspect.

Synthesis and Material Characterization

FIG. 1 is a schematic illustration showing an exemplary flow process for $CuO_x/Co_3O_4$ synthesis by incipient wetness impregnation (IWI) techniques. The IWI of a copper nitrate aqueous solution is prepared of a volumetric quantity equal to the total pore volume of the commercial $Co_3O_4$, as determined by $N_2$ Physisorption at $P/P_0 \approx 0.98$. As shown in FIG. 1, the solution is heated at about 100° C. for about 12 hours to remove water, and subsequently heated at about 450° C. to remove $NO_2$ and $O_2$. The resulting material is subsequently dried and calcined. Table 1, reproduced below, summarizes data from a total of 10 samples, with theoretical and empirical reagent quantities listed in order to achieve Cu surface densities ranging from approximately 0.9 to 10.3 Cu atoms per squared nanometer (Cu/$nm^2$), as determined via ICP. In various preferred embodiments, the $CuO_x$ is provided as a monolayer that includes a two-dimensional, non-crystalline structure. The monolayer may preferably be provided with a surface density of Cu at an empirical loading level of between about 5.9 and about 7.6 Cu atoms per square nanometer (Cu/$nm^2$), or about 6.7 Cu/$nm^2$, as determined by ICP techniques.

TABLE 1

Theoretical and Empirical Reagent Quantities to Synthesize $CuO_x/Co_3O_4$ with various Cu surface densities

| Theoretical Mass Commercial $Co_3O_4$ (g) | Empirical Mass Commercial $Co_3O_4$ (g) | Theoretical Mass $Cu(NO_3)_2*2.5H_2O$ (mg) | Empirical Mass $Cu(NO_3)_2*2.5H_2O$ (mg) | Theoretical Volume $H_2O$ (μl) | Empirical Volume $H_2O$ (μl) | Nominal Cu Loading (Cu/nm²) | Nominal Cu Loading (wt %) | Empirical Cu Loading (Cu/nm²) | Empirical Cu Loading (wt %) |
|---|---|---|---|---|---|---|---|---|---|
| 3 | 3.001 | 40.3 | 40.3 | 0.677 | 0.677 | 1 | 0.37 | 0.9 | 0.33 |
| 3 | 3.002 | 80.6 | 81.0 | 0.668 | 0.667 | 2 | 0.73 | 1.9 | 0.69 |
| 3 | 3.000 | 120.9 | 120.8 | 0.659 | 0.659 | 3 | 1.08 | 2.8 | 1.02 |
| 3 | 3.002 | 161.2 | 161.6 | 0.649 | 0.649 | 4 | 1.45 | 3.8 | 1.38 |
| 3 | 2.999 | 222 | 222.2 | 0.635 | 0.635 | 5.5 | 1.98 | 5.1 | 1.83 |
| 3 | 2.998 | 251.6 | 251.4 | 0.628 | 0.627 | 6.25 | 2.24 | 5.9 | 2.1 |
| 3 | 2.997 | 282 | 281.0 | 0.621 | 0.620 | 7 | 2.5 | 6.7 | 2.33 |
| 3 | 3.001 | 322.3 | 322.3 | 0.612 | 0.612 | 8 | 2.85 | 7.6 | 2.71 |
| 3 | 3.002 | 362.6 | 362.2 | 0.603 | 0.603 | 9 | 3.2 | 8.3 | 2.97 |
| 3 | 3.000 | 443.3 | 443.4 | 0.584 | 0.584 | 11 | 3.88 | 10.3 | 3.62 |

Figure 2:
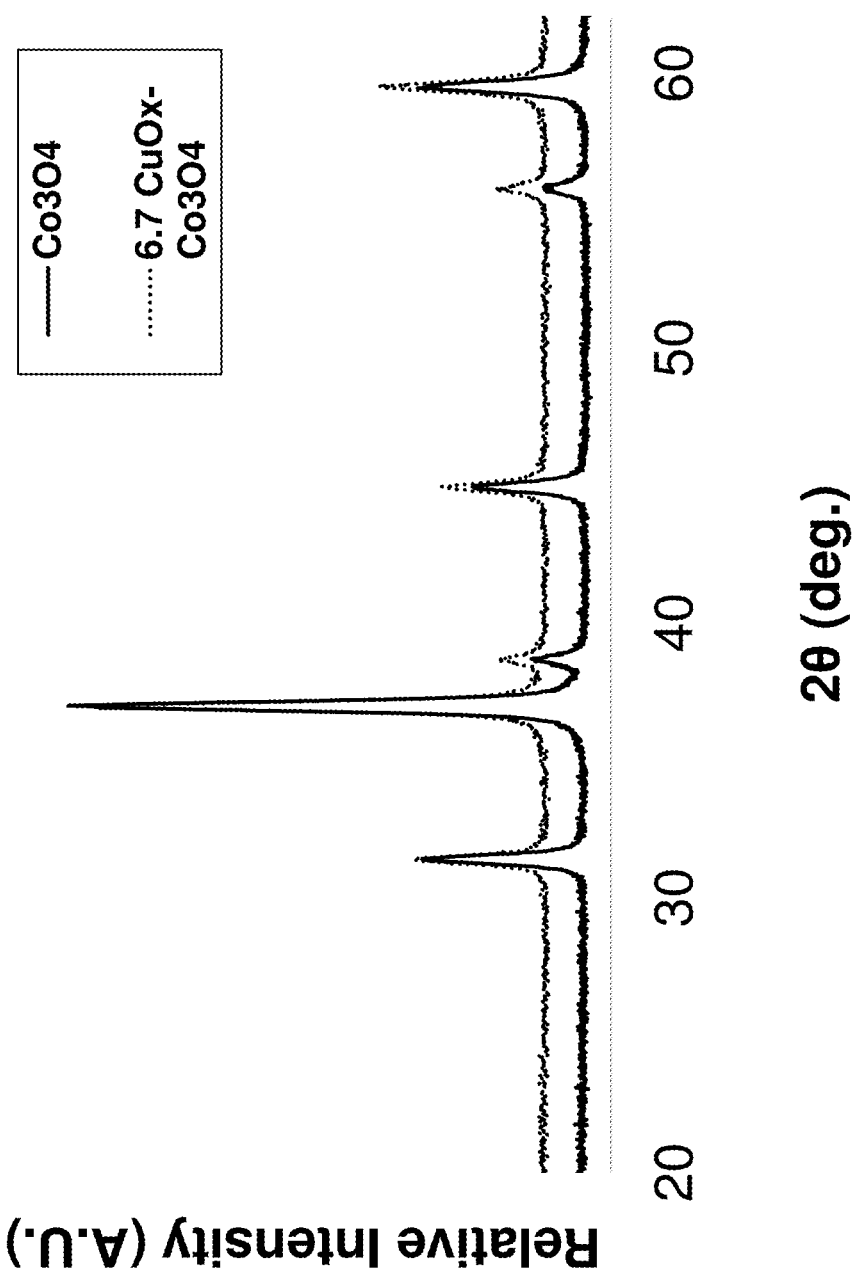
FIG. 2 is an x-ray diffraction (XRD) pattern of 6.7 $CuO_x/Co_3O_4$ as compared to $Co_3O_4$.

FIG. 2 is an x-ray diffraction (XRD) pattern of 6.7 $CuO_x/Co_3O_4$ as compared to $Co_3O_4$ and provides evidence to show the material phase. As shown in FIG. 2, the only phase detected via the powder XRD of the best performing material, 6.7 $CuO_x/Co_3O_4$, is attributed to the $Co_3O_4$ spinel support.

Figure 3:
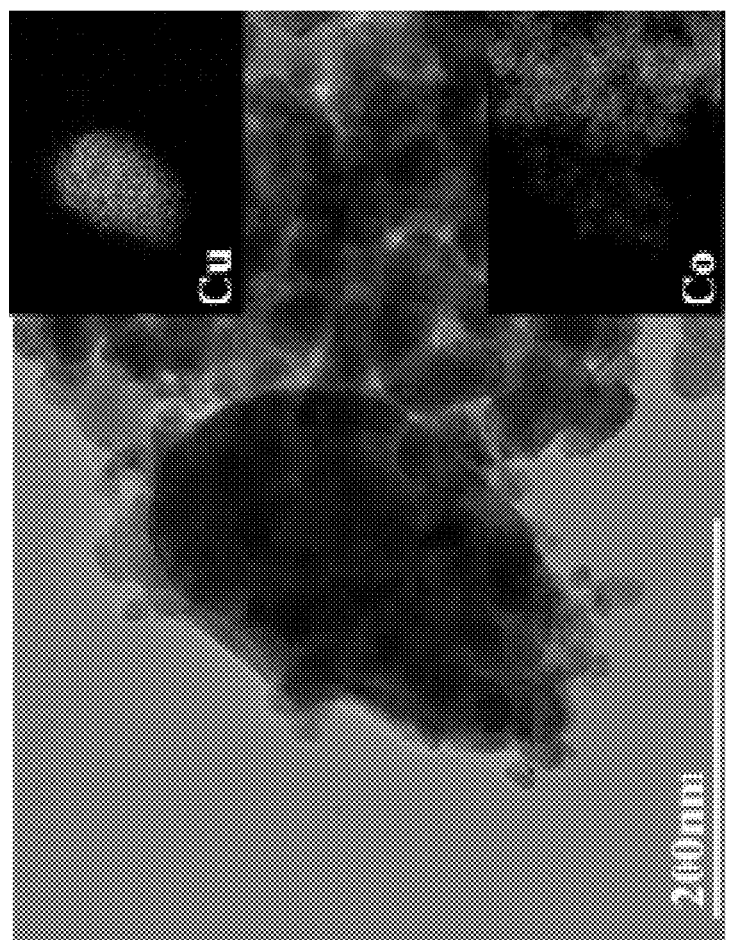
FIG. 3 is a scanning transmission electron microscope (STEM) view of 10.3 $CuO_x/Co_3O_4$ indicating a presence of $CuO_x$ islands on the $Co_3O_4$ surface in excess of a monolayer.

In order to provide evidence of the material structure, FIG. 3 is provided showing a scanning transmission electron microscope (STEM) view of 10.3 $CuO_x/Co_3O_4$ FIG. 3 indicates a presence of the Cu species existing as $CuO_x$ in the form of discrete island regions on the $Co_3O_4$ spinel oxide surface. In various aspects, the monolayer of $CuO_x$ comprises a two-dimensional, non-crystalline, and/or polymeric-like structure. In various aspects, the $Co_3O_4$ spinel oxide may be present in a nanoparticle form, for example, having an average diameter of from about 2 to about 100 nm, or from about 2 to about 50 nm.

Figure 4:
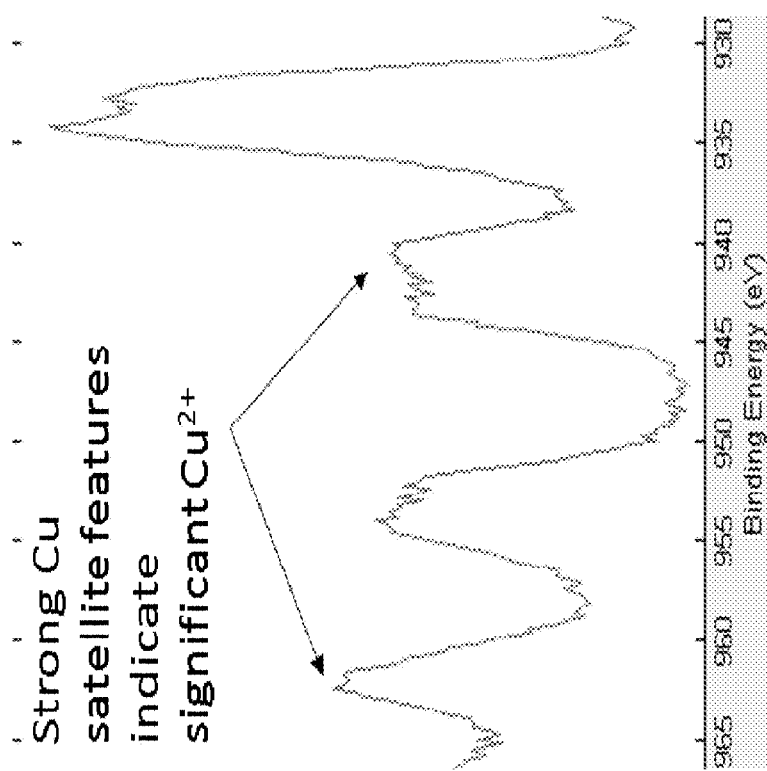
FIG. 4 is an XPS plot indicating the presence of $Cu^{2+}$ oxide.
Figure 5:
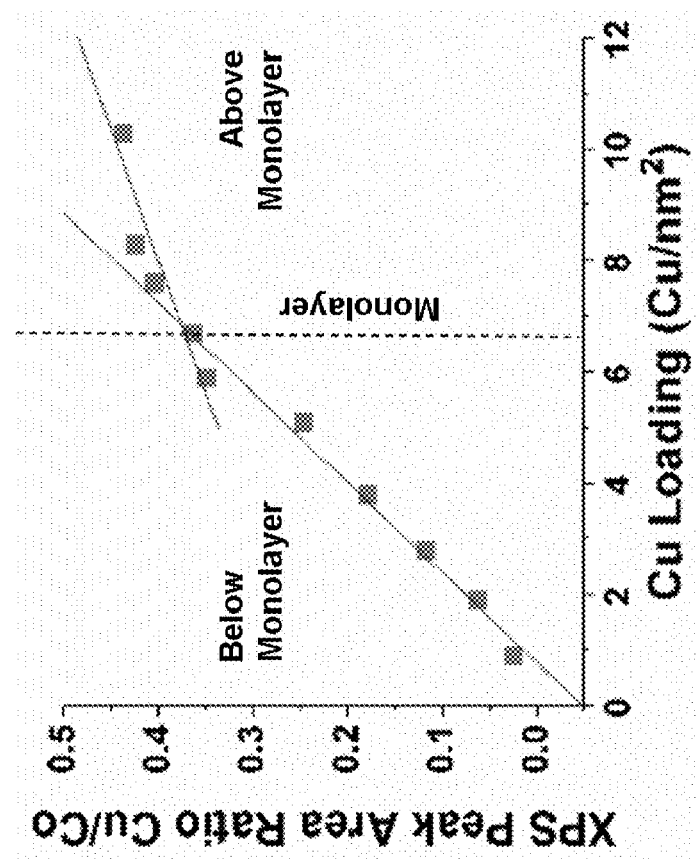
FIG. 5 provides an XPS peak area ratio of Cu/Co versus Cu loading, indicating a $CuO_x$ monolayer formation between about 6.7 and 7.6 $Cu/nm^2$.

In order to further provide evidence of the material structure, FIG. 4 is provided, illustrating an annotated XPS plot. As indicated, the XPS data clearly specifies the presence of $Cu^{2+}$ oxide in the as-prepared material. Still further, FIG. 5 provides an XPS peak area ratio of Cu/Co versus Cu loading. A review of FIG. 5, showing the deviation from linearity between the Cu surface density (x-axis) and the areal ratio of Cu/Co (y-axis), indicates a $CuO_x$ monolayer formation at a particular Cu loading of between about 6.7 and 7.6 Cu/nm².

Figure 6:
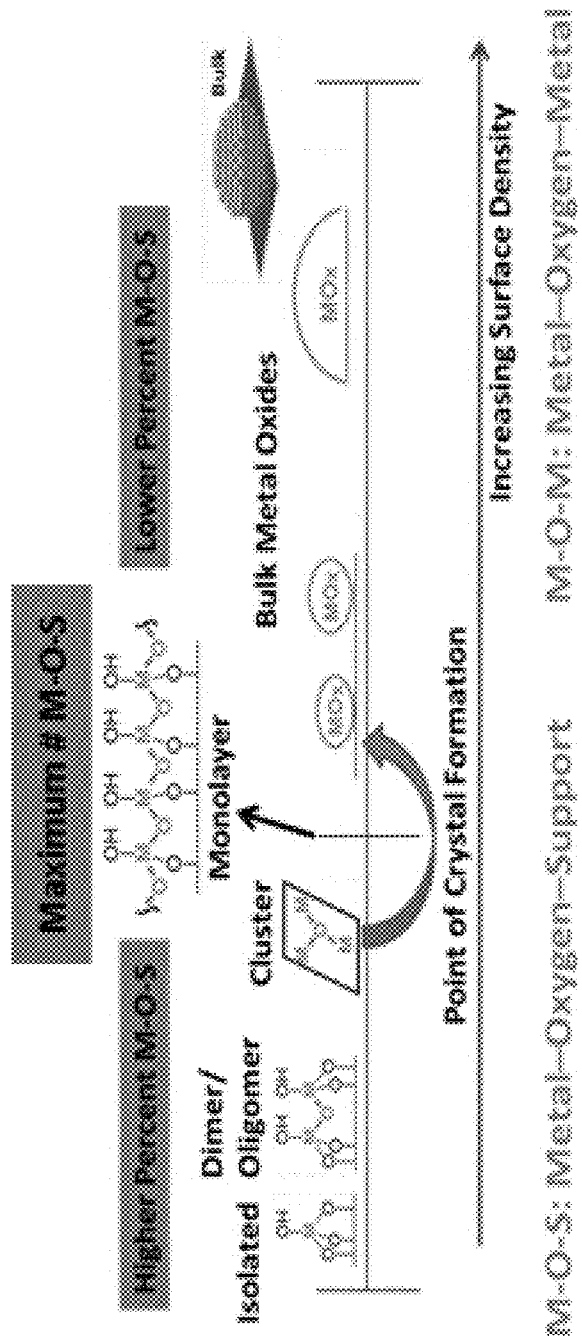
FIG. 6 is a schematic illustration of a sub-monolayer, monolayer, and above-monolayer coverage of supported metal oxide catalyst.

FIG. 6 is a schematic illustration of a sub-monolayer, monolayer, and above-monolayer coverage of supported metal oxide catalyst. This schematically shows the type of oxide coverage based on the surface density of $CuO_x$. At an empirical Cu loading below about 6.7 Cu/nm², the $CuO_x$ species are in a sub-monolayer regime and are highly dispersed, non-crystalline species. At an empirical Cu loading from about 6.7 to 7.6 Cu/nm², the $CuO_x$ creates a monolayer on the $Co_3O_4$ that is a two-dimensional, non-crystalline, polymeric-like structure. At an empirical Cu loading above about 7.6 Cu/nm², the monolayer coverage is exceeded and three-dimensional, bulk-like crystals form and grow.

Performance Evaluation

Figure 7:
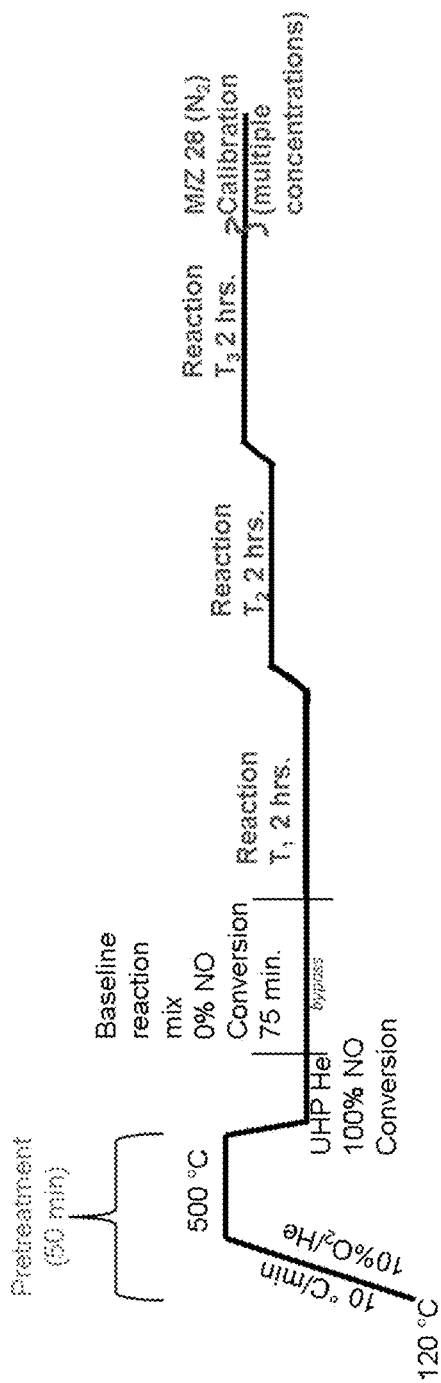
FIG. 7 is a schematic illustration of the direct NOx decomposition reaction process.

FIG. 7 is an exemplary schematic illustration of the direct NOx decomposition reaction process. The materials of the above examples are evaluated using a micro reactor system (Micromeritics Particulate Systems PID Microactivity Reactor), equipped with a quartz plug flow reactor and coupled with a mass spectrometer (MKS Cirrus-2). The NO concentration is tracked by the detector signal for M/Z=30. In order to monitor products, the intensities at M/Z=28, 16 & 32, 44, and 46 are tracked for $N_2$, $O_2$, $N_2O$, and $NO_2$, respectively. Approximately 550 mg of the $CuOx/Co_3O_4$, or 300 mg of Cu-ZSM5, is placed between a bed of quartz wool to maintain a 1 cm bed length of catalyst, for total gas hourly space velocity (GHSV) of about 2,100 h⁻¹. The samples are pretreated to 500° C. at a ramp rate of 10° C./min in 27.8 sccm of 10% $O_2$/He, held for a total of 50 minutes, and cooled to the initial reaction temperature ($T_1$, in most cases is 300° C., 350° C., or 400° C.).

In order to determine the mass spectrometer signal corresponding to 100% conversion of NO, 27.8 sccm of UHP He is flown over the bypass. Then, a reaction mixture containing approximately 1% NOx/He (≈9500 ppm NO, ≈75-100 ppm $NO_2$, ≈25-45 ppm $N_2O$) is flown at 27.8 sccm for 75 minutes to determine the mass spectrometer signal corresponding to 0% conversion of NO. Next, the flow is stabilized over the catalyst, and the reaction mixture at $T_1$ is conducted for 2 hours. After reaction at $T_1$, the reactor is purged for about 15 minutes with UHP He, and then ramped to the next reaction temperature, $T_2$ (for example, 325° C., 375° C., or 450° C., depending on $T_1$), and performance is evaluated for two hours. If desired, performance at a third reaction temperature, $T_3$, is evaluated for two hours, prior to which the reactor is purged for about 15 minutes in UHP He, and then ramped to $T_3$ at 10° C./min (for example, $T_3$ could be either 350° C. or 500° C., based on $T_2$). To determine the total $N_2$ production, a calibration gas consisting of 1137 ppm $N_2$ in a He balance is utilized to calibrate the M/Z=28 response by creating a calibration curve. The calibration curve is utilized to calculate a quantified $N_2$ production.

Figure 8:
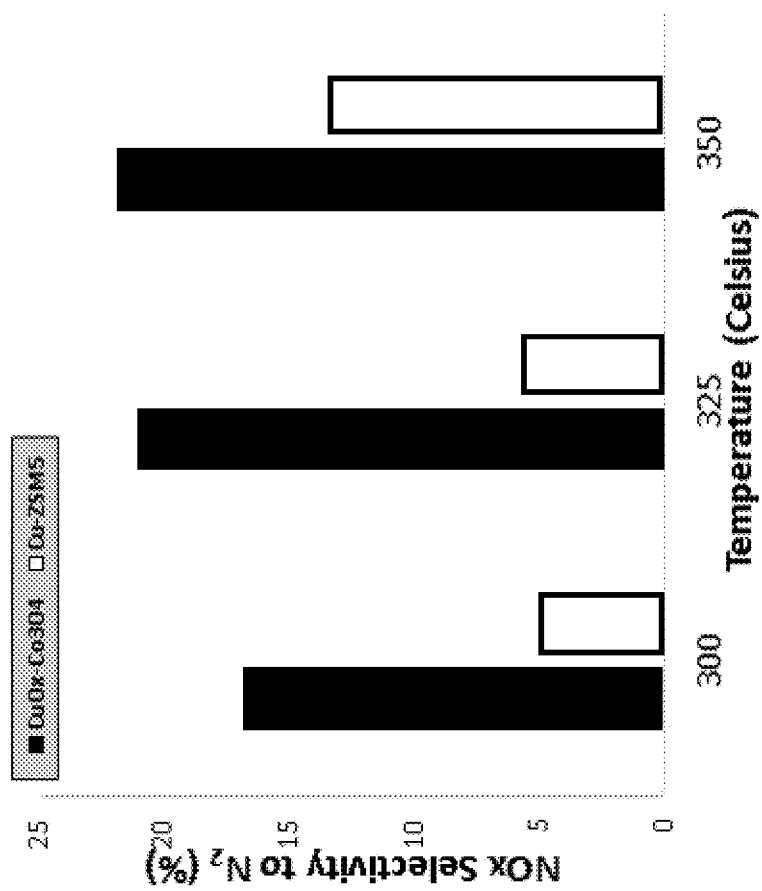
FIG. 8 is a plot showing a comparison of the NOx selectivity to $N_2$ (as a %) between $CuO_x/Co_3O_4$ and Cu-ZSM5.

The total NO conversion (determined by averaging the mass spectrometer signal within the final 3 minutes on stream at each steady-state temperature), is utilized to calculate the rate of NO consumption for $N_2$ production. The rates are then used to subsequently calculate the mass-normalized activity to $N_2$ and Cu molar activity to $N_2$. While the total NO conversion of Cu-ZSM5 is higher than $CuOx/Co_3O_4$ at temperatures of from about 300° C. to 350° C., with similar mass-normalized activity to $N_2$, it can be seen that the $N_2$ selectivity was greater for the $CuOx/Co_3O_4$ from about 300° C. to 350° C. FIG. 8 is a plot showing a comparison of the NOx selectivity to $N_2$ (as a %) between $CuO_x/Co_3O_4$ and Cu-ZSM5. In various aspects, the present teachings can be configured to flow the exhaust gas stream through the catalyst system at a temperature at or less than about 300° C. and obtain an NOx selectivity to $N_2$ greater than about 15%. In various other aspects, the present teachings can be configured to flow the exhaust gas stream through the catalyst system at a temperature at or less than about 350° C. and obtain an NOx selectivity to $N_2$ greater than about 20%.

Figure 9:
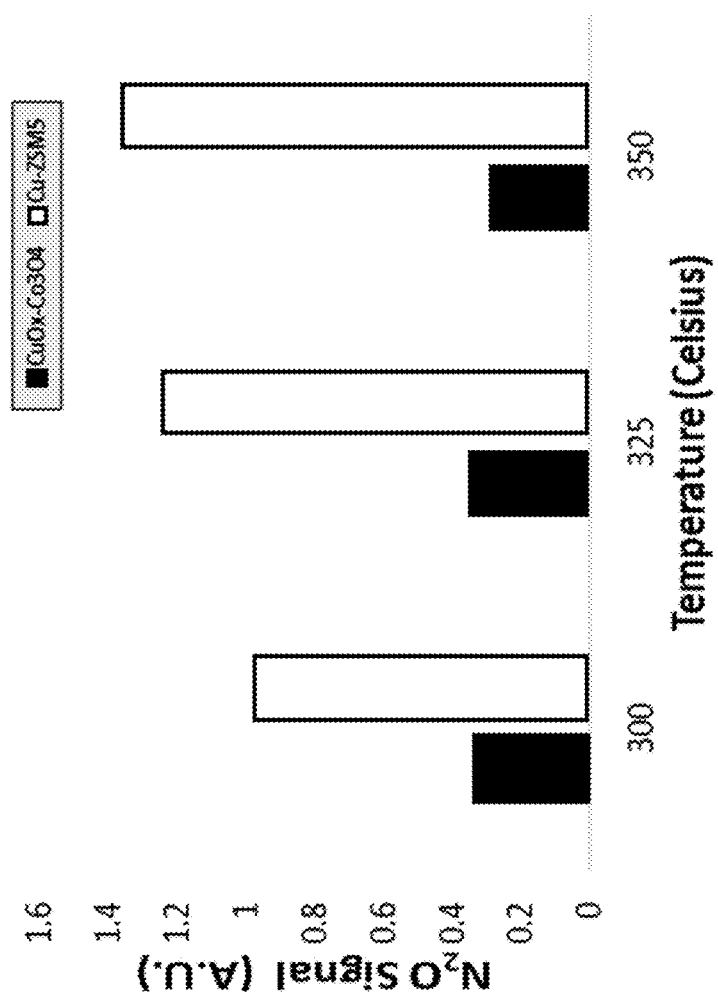
FIG. 9 is a plot showing a comparison of M/Z 44 ($N_2O$) relative abundance over $CuO_x/Co_3O_4$ and Cu-ZSM5 during direct NO decomposition.
Figure 10:
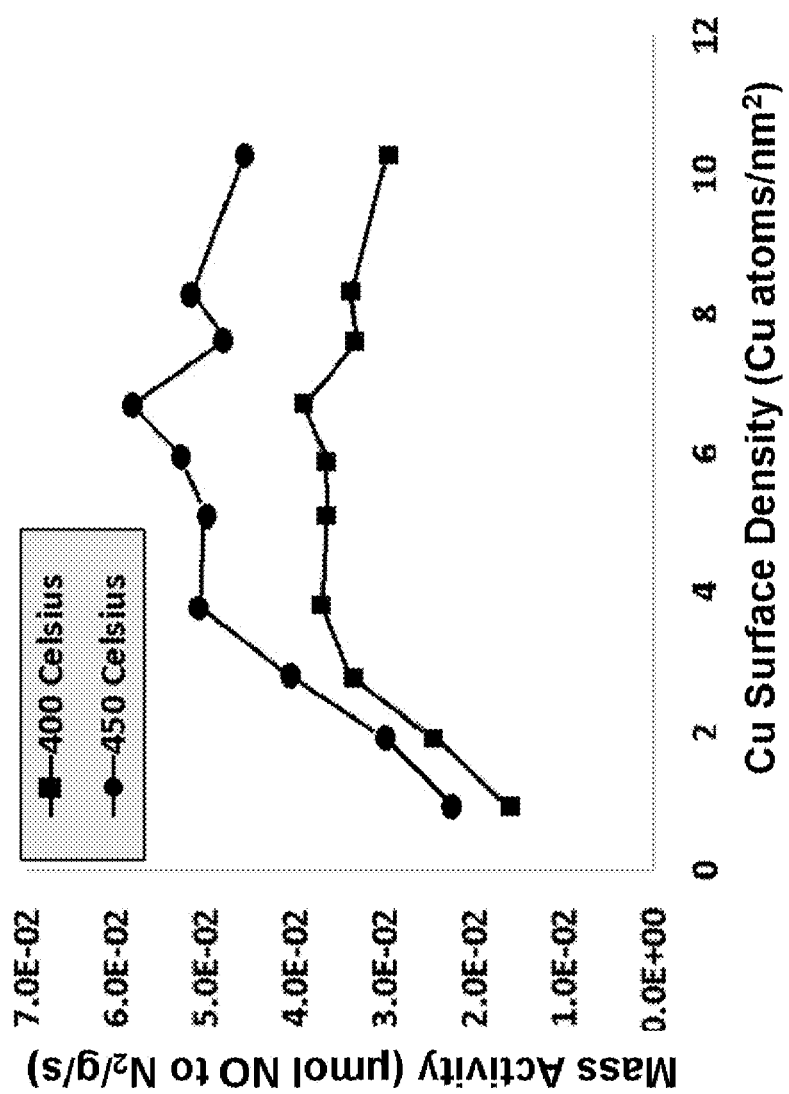
FIG. 10 illustrates NO decomposition mass activity to $N_2$ over $CuO_x/Co_3O_4$ as a function of Cu surface density at 400° C. and 450° C.

Furthermore, a significant portion of the NO conversion over Cu-ZSM5 catalyst is attributed to production of $N_2O$, which is significantly greater than that of $CuO_x/Co_3O_4$. FIG. 9 is a plot showing a comparison of M/Z 44 ($N_2O$) relative abundance over $CuO_x/Co_3O_4$ and Cu-ZSM5 during direct NO decomposition;

The total mass-normalized activity to $N_2$ reaches a maximum for the $CuOx/Co_3O_4$ system around the onset of monolayer coverage at 400° C. and 450° C., suggesting that the Cu—O—Co interface plays a key role in the direct NO decomposition performance. FIG. 10 illustrates NO decomposition mass activity to $N_2$ over $CuO_x/Co_3O_4$ as a function of Cu surface density at 400° C. and 450° C.

Figure 11:
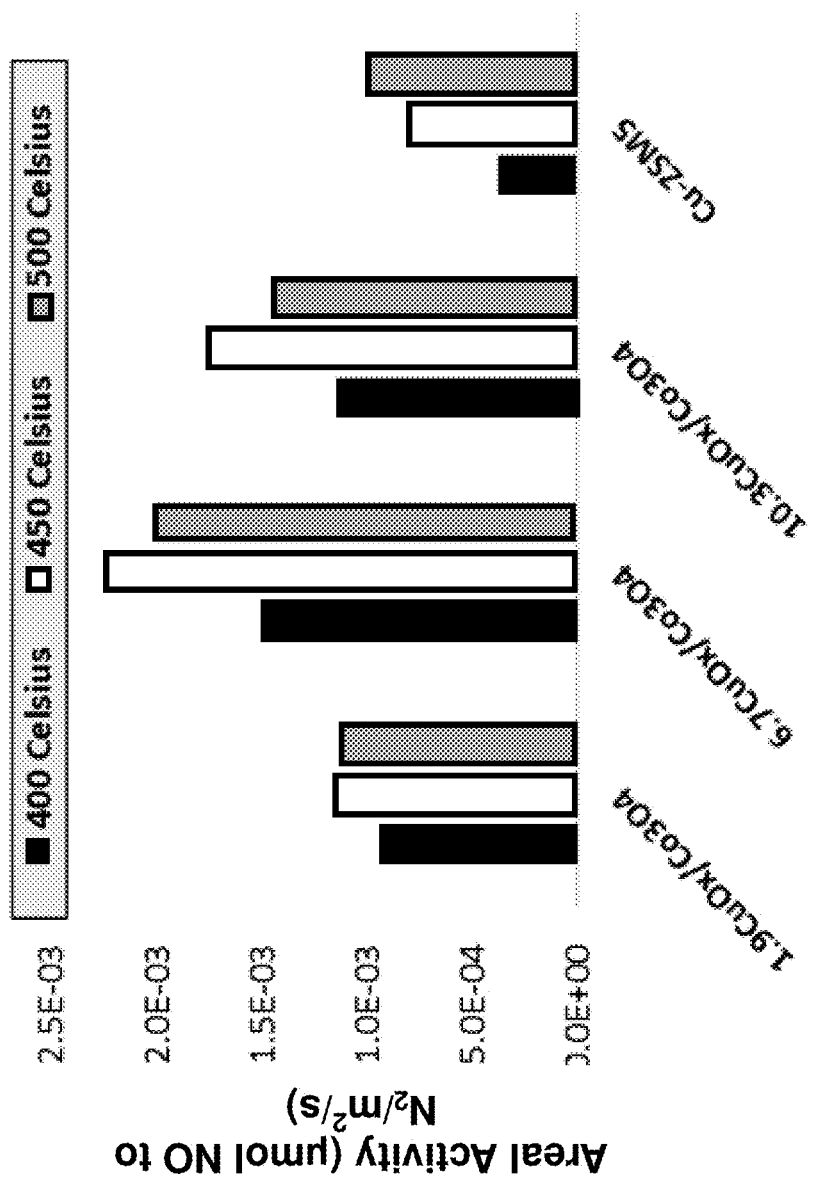
FIG. 11 illustrates surface area-normalized direct NO decomposition activity over $CuO_x/Co_3O_4$ of several $CuO_x$ surface densities and Cu-ZSM5 at various temperatures.

FIG. 11 illustrates surface-area normalized direct NO decomposition activity over $CuO_x/Co_3O_4$ of several $CuO_x$ surface densities and Cu-ZSM5 at various temperatures. As shown, FIG. 11 indicates that the total surface-area normalized activity to $N_2$ is up to 4× higher for $CuO_x/Co_3O_4$ (BET Specific Surface Area≈26 $m^2/g$) as compared to Cu-ZSM5 (BET Specific Surface Area≈317 $m^2/g$) at 400° C. The $CuO_x/Co_3O_4$ maintains the advantage at 450° C. and 500° C. as well.

Figure 12:
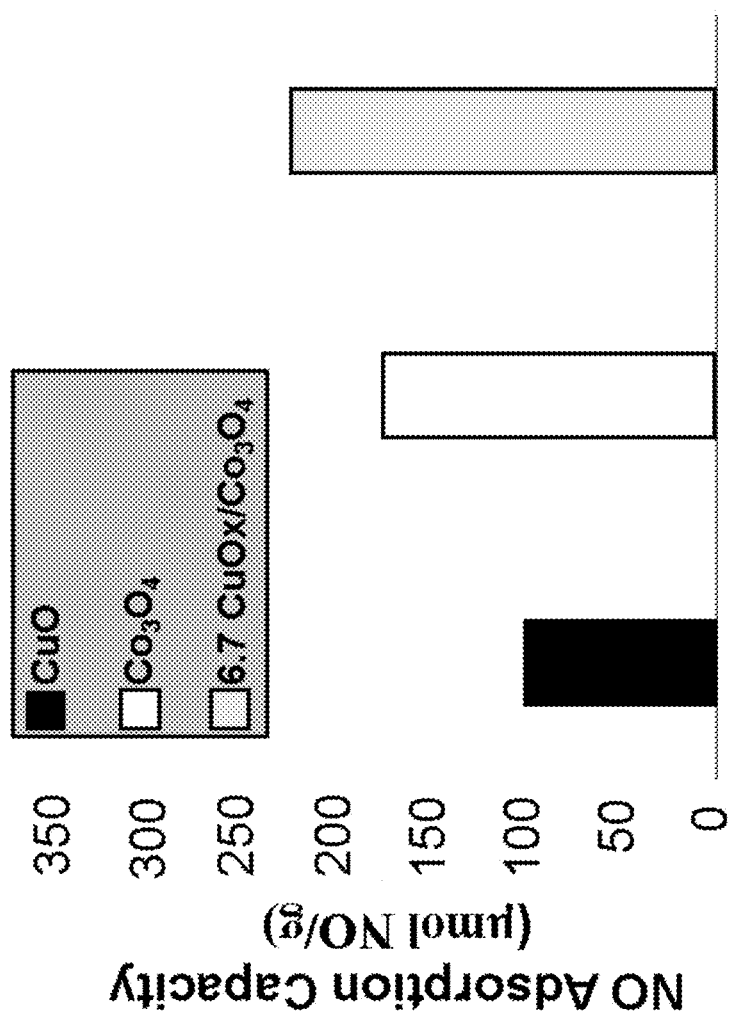
FIG. 12 illustrates NO adsorption capacity at 100° C. of $Co_3O_4$, $CuO_x/Co_3O_4$, and CuO.

In an effort to begin to understand the mechanism for the improved NO decomposition activity over the $CuOx/Co_3O_4$, NO adsorption/desorption performance for $CuOx/Co_3O_4$ is compared to that of the individual components (CuO, $Co_3O_4$). For example, the NO adsorption/desorption is monitored using a Thermogravimetric Analyzer Coupled with online Mass Spectrometer (Netzsch Jupiter STA449 F1 and Aëolos QMS4030DA00.000-00). After pretreatment to 500° C. in 10% $O_2$/Ar for 50 minutes (similar to the reaction), the temperature is cooled to 100° C. NO is allowed to pass for about 3 hours. The difference in mass both prior to NO adsorption and after NO adsorption is measured and utilized to determine the total NO adsorption capacity of the materials in µmol per gram sample. FIG. 12 illustrates NO adsorption capacity at 100° C. of $Co_3O_4$, $CuO_x/Co_3O_4$, and CuO. As shown, the thermogravimetric results reveal an increased NO adsorption capacity for $CuO_x/Co_3O_4$ as compared to the individual $Co_3O_4$ or CuO components. In various aspects, the present technology can provide a catalytic converter configured to exhibit an NO adsorption capacity of greater than about 200 µmol NO/g, significantly higher than that of $CuO_x$ and/or $Co_3O_4$ individually.

Figure 13:
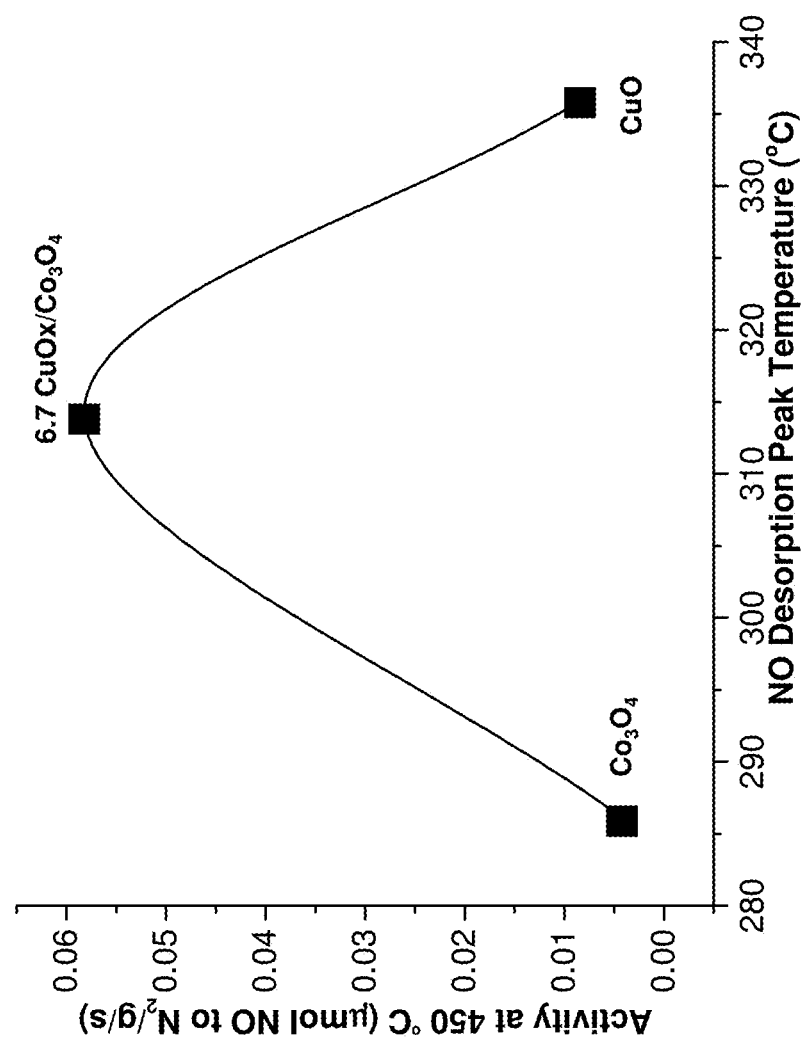
FIG. 13 illustrates the M/Z 30 (NO) profile between 225° C. and 500° C. during NO-TPD over $Co_3O_4$, CuO, and 6.7 $CuO_x/Co_3O_4$.

After adsorption, the NO gas is turned off, and the materials are ramped in Ar from 100° C. to 500° C. at 10° C./min while monitoring the desorption of NO via the mass spectrometer signal at M/Z=30. FIG. 13 illustrates the M/Z 30 (NO) profile between 225° C. and 500° C. during NO-TPD over $Co_3O_4$, CuO, and 6.7 $CuO_x/Co_3O_4$. Notably, the CuO individual component does not desorb significant amounts of NO from 100° C. to 500° C., reaching a maximum rate at about 336° C. This relatively high maximum desorption temperature indicates the NO surface species on CuO are bound too strongly and are too scarce (low NO adsorption capacity) to maintain good activity. $Co_3O_4$ reaches a maximum NO desorption rate at about 286° C., releasing significant NO at relatively low temperature. The relatively low maximum adsorption temperature on the $Co_3O_4$ is averse to maintaining high activity as the NO surface species have desorbed prior to achieving a high enough reaction temperature. However, $CuO_x/Co_3O_4$ reaches a maximum NO desorption rate at about 314° C., indicating intermediate binding strength of the adsorbed NO surface species compared to the parent materials CuO and $Co_3O_4$.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A catalyst system for the direct decomposition removal of NOx from an exhaust gas stream provided at a temperature of less than about 500° C., the catalyst system comprising:

a $Co_3O_4$ spinel oxide; and a plurality of discrete island regions of $CuO_x$ supported on a surface of the $Co_3O_4$ spinel oxide and configured to catalyze a reduction of the NOx to generate $N_2$ without the presence of a reductant, wherein each of the plurality of the discrete island regions of CuOx comprises a two-dimensional, non-crystalline structure provided with a surface density of Cu at an empirical loading level of between about 6.7 and about 7.6 Cu atoms per square nanometer (Cu/nm$^2$) as determined by ICP techniques.

2. The catalyst system according to claim 1, wherein the discrete island regions of $CuO_x$ supported on the $Co_3O_4$ spinel oxide are formed using incipient wetness impregnation techniques.

3. A catalytic converter for the direct decomposition removal of NOx from an exhaust gas stream flowing at a temperature of less than or equal to about 500° C., the catalytic converter comprising:
    an inlet configured to receive the exhaust gas stream into an enclosure;
    an outlet configured to allow the exhaust gas stream to exit the enclosure; and
    a catalyst system contained inside the enclosure, the catalyst system comprising a plurality of discrete island regions of CuOx supported on a surface of a $Co_3O_4$ spinel oxide support that is configured to catalyze a reduction of the NOx to generate $N_2$ without the presence of a reductant, wherein each of the plurality of the discrete island regions of CuOx comprises a two-dimensional, non-crystalline structure provided with a surface density of Cu at an empirical loading level of between about 6.7 and about 7.6 Cu atoms per square nanometer (Cu/nm$^2$) as determined by ICP techniques.

4. The catalytic converter according to claim 3, wherein the $Co_3O_4$ spinel oxide is in a nanoparticle form, having an average diameter of from about 2 to about 100 nm.

5. The catalytic converter according to claim 3, wherein the discrete island regions of CuOx supported on the $Co_3O_4$ spinel oxide are formed using incipient wetness impregnation techniques.

6. The catalytic converter according to claim 3, wherein the catalyst system is provided with a surface density of Cu at an empirical loading level of about 6.7 Cu atoms per square nanometer (Cu/nm$^2$) as determined by ICP techniques.

7. The catalytic converter according to claim 3, configured to flow the exhaust gas stream through the catalyst system at a temperature at or less than about 350° C. and obtaining an NOx selectivity to $N_2$ greater than about 20%.

8. The catalytic converter according to claim 3, configured to flow the exhaust gas stream through the catalyst system at a temperature at or less than about 300° C. and obtaining an NOx selectivity to $N_2$ greater than about 15%.

9. The catalytic converter according to claim 3, configured to exhibit an NO adsorption capacity of greater than about 200 μmol NO/g.

10. A method for direct decomposition removal of NOx from a low temperature exhaust gas stream, the method comprising:
    flowing the exhaust gas stream through a catalyst system and exposing the exhaust gas stream to a plurality of discrete island regions of copper oxide supported on a $Co_3O_4$ spinel oxide support, each of the plurality of the discrete island regions of CuOx comprising a two-dimensional, non-crystalline structure provided with a surface density of Cu at an empirical loading level of between about 6.7 and about 7.6 Cu atoms per square nanometer (Cu/nm$^2$) as determined by ICP techniques; and
    catalyzing a reduction of the NOx to generate $N_2$ without the presence of a reductant.

11. The method according to claim 10, wherein the CuOx is supported on the $Co_3O_4$ spinel oxide using incipient wetness impregnation techniques.

12. The method according to claim 10, comprising flowing the exhaust gas stream through the catalyst system at a temperature at or less than about 350° C. and obtaining an NOx selectivity to $N_2$ greater than about 20%.

13. The method according to claim 10, comprising flowing the exhaust gas stream through the catalyst system at a temperature at or less than about 300° C. and obtaining an NOx selectivity to $N_2$ greater than about 15%.

* * * * *